(12) United States Patent
Sumiyoshi et al.

(10) Patent No.: US 6,463,083 B1
(45) Date of Patent: Oct. 8, 2002

(54) LASER RADIATION DEVICE EMPLOYING A FIBER LASER CAPABLE OF EMITTING A LASER BEAM INCLUDING TWO OR MORE WAVELENGTH COMPONENTS

(75) Inventors: Tetsumi Sumiyoshi, Tokyo (JP); Hitoshi Sekita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,749

(22) Filed: Sep. 7, 1999

(30) Foreign Application Priority Data

Sep. 11, 1998 (JP) .......................... 10-258495

(51) Int. Cl.[7] ................................. H01S 3/30
(52) U.S. Cl. .......................................... 372/6
(58) Field of Search .................... 372/6, 75, 3

(56) References Cited

U.S. PATENT DOCUMENTS

| | | | |
|---|---|---|---|
| 4,532,400 A | | 7/1985 | Toida et al. |
| 4,835,778 A | * | 5/1989 | Kafka et al. .................. 372/6 |
| 4,955,025 A | * | 9/1990 | Mears et al. ................... 372/6 |
| 5,084,880 A | * | 1/1992 | Esterowitz ..................... 372/6 |
| 5,125,922 A | | 6/1992 | Dwyer et al. |
| 5,226,049 A | * | 7/1993 | Grubb ........................... 372/6 |
| 5,313,477 A | | 5/1994 | Esterowitz et al. |
| 5,314,477 A | * | 5/1994 | Esterowitz et al. ............ 372/6 |
| 5,369,523 A | * | 11/1994 | Millar et al. ................ 372/40 |
| 5,432,806 A | * | 7/1995 | Snitzer .......................... 372/6 |
| 5,524,118 A | | 6/1996 | Kim et al. ..................... 372/6 |
| 5,710,786 A | * | 1/1998 | Mackechnie et al. .......... 372/6 |

FOREIGN PATENT DOCUMENTS

| | | |
|---|---|---|
| JP | 61-48351 | 3/1986 |
| JP | 62-254117 | 11/1987 |
| JP | 5-84315 | 4/1993 |
| JP | 8-56954 | 3/1996 |
| JP | 10-335734 | 12/1998 |
| WO | WO 97/31410 | 8/1997 |

OTHER PUBLICATIONS

LEOS '97, Conference Proceedidngs,10th Annual Meeting "IEEE Lasers and Electro–Optics Society 1997 Annual Meeting", pp. 534–535.
Appl. Phys. Lett. 53 (14), Oct. 3, 1988, "Mulitwavelength cw laser oscillation in a Nd3+ and Er3+ doubly doped fiber laser", pp. 1251–1253, Yasuo Kimura and Masataka Nakazawa (NTT Transmission Systems Laboratories, Tokai, Ibaraki–ken 319–11, Japan).
Korean Office Action with partial English translation dated Sep. 27, 2001.

* cited by examiner

Primary Examiner—Leon Scott, Jr.
(74) Attorney, Agent, or Firm—McGinn & Gibb, PLLC

(57) ABSTRACT

A laser radiation device comprises a pumping light emission section, a fiber laser device and a beam guiding section. The pumping light emission section generates and emits pumping light. In the fiber laser device, an optical fiber doped with laser ions is excited by the pumping light and thereby a laser beam including two or more wavelength components is generated. The beam guiding section guides the laser beam into desired place and direction. The laser beam including the two or more wavelength components having characteristic effects are focused by a beam shaping section and applied to the surface of an object. When holmium ions are doped in the optical fiber of the fiber laser device as the laser ions, a laser beam including a 3 $\mu$m band component (which is suitable for precise incision of a living body) and a 2 $\mu$m band component (which is suitable for tissue coagulation and hemostasis) is emitted by the fiber laser device, and the two wavelength components are applied to the surface of the object maintaining coaxiality, thereby the two effects of the two wavelength components are attained simultaneously on the object. The laser radiation device including only one laser device can be implemented with low manufacturing cost and in a small size.

22 Claims, 7 Drawing Sheets

73 ENERGY LEVELS OF HOLMIUM IONS

LASER RADIATION DEVICE EMPLOYING A FIBER LASER CAPABLE OF EMITTING A LASER BEAM INCLUDING TWO OR MORE WAVELENGTH COMPONENTS

BACKGROUND OF THE INVENTION

The present invention relates to a laser radiation device, and in particular, to a laser radiation device which employs a fiber laser that is capable of emitting a laser beam including two or more wavelength components.

DESCRIPTION OF THE PRIOR ART

Laser radiation devices for radiating objects with laser beams have widely been brought to practical use today in the fields of metal processing, semiconductor processing, medical care, etc. In almost laser radiation devices, a laser capable of emitting a laser beam including only one wavelength component is employed. Interaction between a laser beam and an object (metal, a semiconductor, a living body, etc.) depends on the wavelength of the laser beam, therefore, the oscillation wavelength of a laser radiation device is determined and selected depending on which interaction is desired. The absorption coefficient of a living body varies depending on parts (protein, fat, bone, water, etc.) of the living body. For instance, a 2 $\mu$m band laser beam is known to be suitable for coagulation of soft tissue, a 9 $\mu$m band laser beam is known to be suitable for perforation of dentin, a 3 $\mu$m band laser beam is known to be suitable for precise incision, and a 10 $\mu$m band laser beam etc. are known to be suitable for normal incision. A surgical laser knife which is provided with a 10 $\mu$m band $CO_2$ laser oscillator is in practical use today. As described above, laser radiation devices which are capable of emitting a laser beam including only one wavelength component have been used in almost cases. However, in the field of surgical laser knives, for example, it is also possible to implement and use a laser radiation device that is capable of emitting a laser beam including two or more wavelength components so that two or more effects can be attained simultaneously.

FIG. 1 is a schematic diagram showing a conventional laser radiation device which can be employed for emitting a laser beam including two or more wavelength components. The laser radiation device 31 shown in FIG. 1 includes a first laser device 21, a first collimator lens 23, a second laser device 24, a second collimator lens 26, a dichroic mirror 27, a total reflection mirror 29, and a focusing lens 30.

The first laser device 21 and the second laser device 24 having different oscillation frequencies emit a first laser beam 22 and a second laser beam 25 respectively. The first laser beam 22 and the second laser beam 25 emitted by the laser device 21 and 24 respectively are shaped into collimated beams by the first collimator lens 23 and the second collimator lens 26 respectively so as to be propagated in fixed directions losslessly, coupled together by the dichroic mirror 27, guided (reflected) by the total reflection mirror 29, and applied to an object 11 through the focusing lens 30. The characteristics of the two wavelength components (i.e. the first laser beam 22 and the second laser beam 25), such as the intensity, can be varied by controlling the first laser device 21 and the second laser device 24 respectively. The dichroic mirror 27 has high transmission (transmissivity) for the first laser beam 22 and high reflectivity for the second laser beam 25.

In the case where the above laser radiation device 31 is employed for a surgical laser knife, coupling of a 3 $\mu$m band laser beam (which is suitable for precise incision of a living body) with a 2 $\mu$m band laser beam (which is suitable for tissue coagulation and hemostasis by means of denaturalization of protein) is a desirable selection. In such a case, an Er (erbium)-doped YAG (yttrium aluminium garnet) crystal laser having an oscillation frequency of 2.94 $\mu$m which is pumped by a 970 nm laser diode can be employed as the first laser device 21, and a Tm (thulium)-Ho(holmium)-co-doped YLF (yttrium lithium fluoride) crystal laser having an oscillation frequency of 2.06 $\mu$m which is pumped by a 790 nm laser diode can be employed as the second laser device 24. If it is necessary to further couple a third laser beam (generated by another laser device having another oscillation frequency) to the coupled laser beam 28, the coupling can be attained by adding a coupling means which is similar to the dichroic mirror 27.

As described above, it is possible to exert two or more effects (each of which is characteristic of each wavelength component) on the object simultaneously, by employing the laser radiation device 31 employing the two laser devices 21 and 24 to the surgical laser knife. It is also possible to change characteristics of each wavelength component (such as the intensity) by controlling the two laser devices 21 and 24 depending on the characteristics of the object and desired effects, therefore, the intensity of each wavelength component in the coupled laser beam can be set optimally by controlling the two laser devices 21 and 24 respectively.

However, in the case where two or more different laser beams are coupled together and guided in the same direction, the optical axes of the laser beams having different wavelengths can have misalignment in the coupling. Further, the propagation characteristics of each wavelength component varies depending on the laser device that emitted the wavelength component, and thus misalignment and variations in the intensity can occur on the object especially when the laser beams are focused on the object. Furthermore, the laser beams generated and emitted by the laser radiation device are not necessarily visible, and thus it is not easy to check and adjust the positions of the focused laser beams (focused laser beam spots) on the object. Moreover, the above laser radiation device needs to be provided with two or more laser devices, therefore, the cost necessary for the laser beam sources (principle parts of the laser radiation device) becomes twice, the power consumption becomes large, and the size of the laser radiation device is necessitated to be large.

SUMMARY OF THE INVENTION

It is therefore the primary object of the present invention to provide a laser radiation device which is capable of generating and emitting a laser beam including two or more wavelength components and applying the two or more wavelength components to the object coaxially in uniform and stable irradiation conditions.

Another object of the present invention is to provide a laser radiation device which is capable of generating and emitting a laser beam including two or more wavelength components and applying the two or more wavelength components to the object, which can be realized with a low manufacturing cost, small running costs, and in a small size.

Another object of the present invention is to provide a laser radiation device which is capable of generating and emitting a laser beam including two or more wavelength components and applying the two or more wavelength components to the object, by which the user of the laser radiation device can easily see and recognize the irradiation point (i.e. a focused beam spot) of the laser beam on the object.

In accordance with a first aspect of the present invention, there is provided a laser radiation device comprising a pumping light emission means, a fiber laser means and a beam guiding means. The pumping light emission means generates and emits pumping light. In the fiber laser means, an optical fiber doped with laser ions is excited by the pumping light emitted by the pumping light emission means, and thereby a laser beam including two or more wavelength components is generated. The beam guiding means guides the laser beam generated by the fiber laser means into desired place and direction.

In accordance with a second aspect of the present invention, in the first aspect, the laser radiation device further comprises a beam shaping means for shaping the laser beam guided by the beam guiding means.

In accordance with a third aspect of the present invention, in the second aspect, the beam shaping means focuses the laser beam so that a focused laser beam including the two or more wavelength components will be applied to the object.

In accordance with a fourth aspect of the present invention, in the second aspect, the beam shaping means controls the shapes and/or areas of beam spots of the wavelength components on the object independently.

In accordance with a fifth aspect of the present invention, in the first aspect, the laser radiation device further comprises a beam modulation means for modulating optical characteristics of each of the wavelength components included in the laser beam.

In accordance with a sixth aspect of the present invention, in the fifth aspect, the beam modulation means includes one or more optical filters which can change the powers of one or more of the wavelength components.

In accordance with a seventh aspect of the present invention, in the first aspect, the beam guiding means includes two or more reflection means which are arranged in a multiple-joint arm configuration.

In accordance with an eighth aspect of the present invention, in the first aspect, the beam guiding means is implemented by a guiding optical fiber.

In accordance with a ninth aspect of the present invention, in the first aspect, the beam guiding means is implemented by the optical fiber of the fiber laser means.

In accordance with a tenth aspect of the present invention, in the first aspect, the laser radiation device further comprises a pointing beam emission means. The pointing beam emission means generates and emits a pointing beam for indicating the optical axis of the laser beam or the irradiation point of the laser beam on the object.

In accordance with an eleventh aspect of the present invention, in the tenth aspect, the laser radiation device further comprises a pointing beam coupling means for coupling the pointing beam emitted by the pointing beam emission means with the laser beam coaxially.

In accordance with a twelfth aspect of the present invention, in the eleventh aspect, the pointing beam coupling means is implemented by a total reflection element of the beam guiding means which transmits the pointing beam while reflecting the laser beam.

In accordance with a thirteenth aspect of the present invention, in the eleventh aspect, the pointing beam coupling means is implemented by an optical coupler which is attached to a guiding optical fiber which implements the beam guiding means.

In accordance with a fourteenth aspect of the present invention, in the tenth aspect, one or more of the wavelength components of the laser beam generated by the fiber laser means are visible beams, and one or more of the visible beams are used as the pointing beam.

In accordance with a fifteenth aspect of the present invention, in the tenth aspect, the laser radiation device further comprises a pointing beam reflection monitoring means. The pointing beam reflection monitoring means monitors the status of the object at the irradiation point in real time, by monitoring the intensity of the reflection of the pointing beam from the irradiation point.

In accordance with a sixteenth aspect of the present invention, in the first aspect, one or more kinds of rare-earth ions are doped in the optical fiber of the fiber laser means as the laser ions.

In accordance with a seventeenth aspect of the present invention, in the first aspect, the pumping light emission means includes one or more light sources and generates and emits the pumping light that includes two or more wavelength components.

In accordance with an eighteenth aspect of the present invention, in the first aspect, the optical fiber of the fiber laser means is doped with holmium ions and thulium ions.

In accordance with a nineteenth aspect of the present invention, in the first aspect, the optical fiber of the fiber laser means is doped with holmium ions as laser ions, and an optical fiber doped with thulium ions is connected to the optical fiber of the fiber laser means for emitting a 480 nm band pointing beam for indicating the optical axis of the laser beam or the irradiation point of the laser beam on the object.

In accordance with a twentieth aspect of the present invention, in the first aspect, holmium ions are doped in the optical fiber of the fiber laser means as the laser ions, and the pumping light emission means generates and emits the pumping light that includes 890 nm band pumping light and/or 1.1 μm band pumping light, and the laser beam emitted by the optical fiber of the fiber laser means at least includes a 3 μm band component and a 2 μm band component.

In accordance with a twenty-first aspect of the present invention, in the twentieth aspect, the optical fiber of the fiber laser means further emits one or more laser beams and/or fluorescence of a 550 nm band and/or a 640 nm band.

In accordance with a twenty-second aspect of the present invention, in the first aspect, thulium ions are doped in the optical fiber of the fiber laser means, and the laser beam emitted by the optical fiber of the fiber laser means at least includes two or more wavelength components and a laser beam or fluorescence of a 480 nm band.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
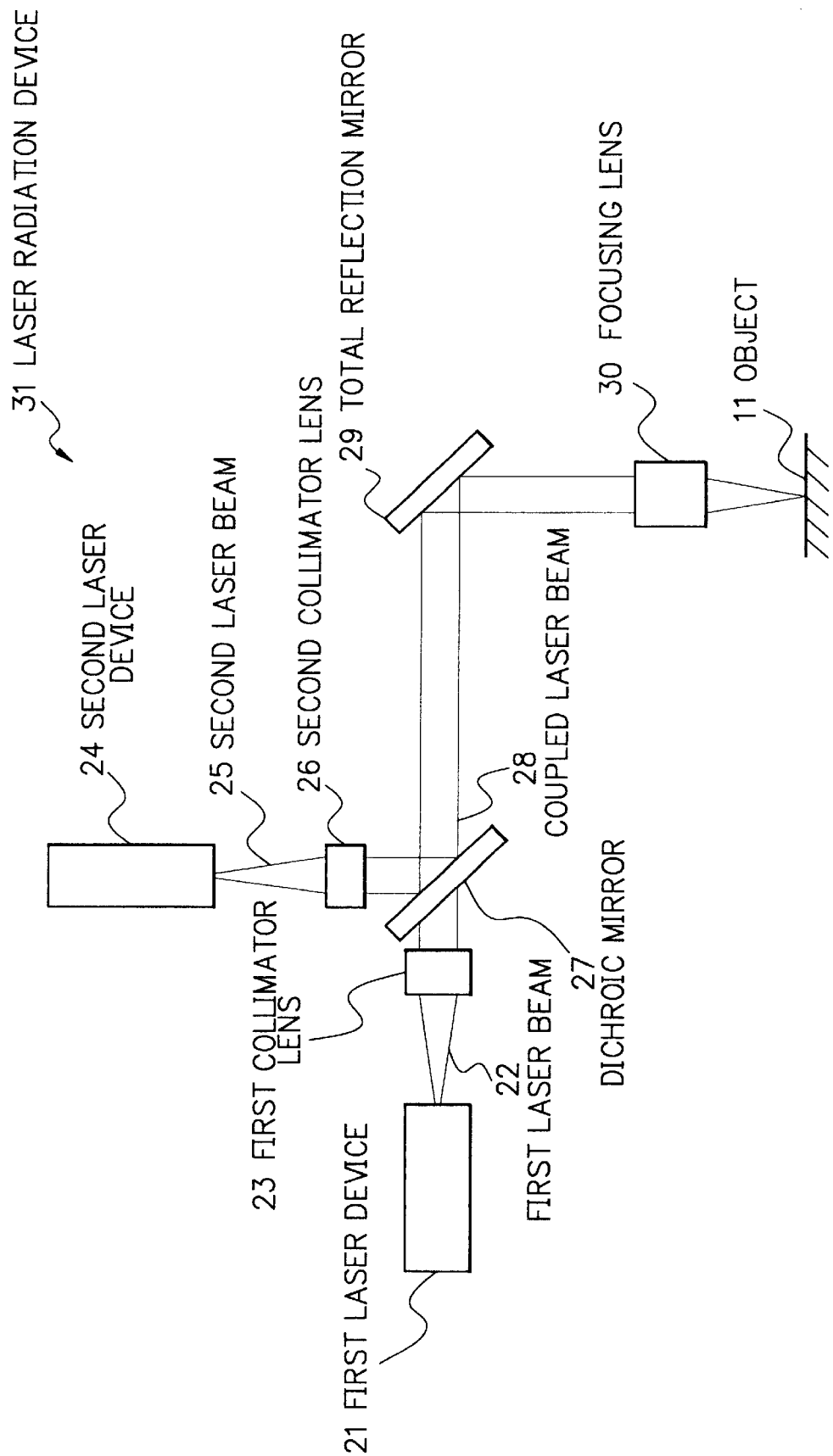
FIG. 1 is a schematic diagram showing a conventional laser radiation device which can be employed for emitting a laser beam including two or more wavelength components.

Referring now to the drawings, a description will be given in detail of preferred embodiments in accordance with the present invention.

Figure 2:
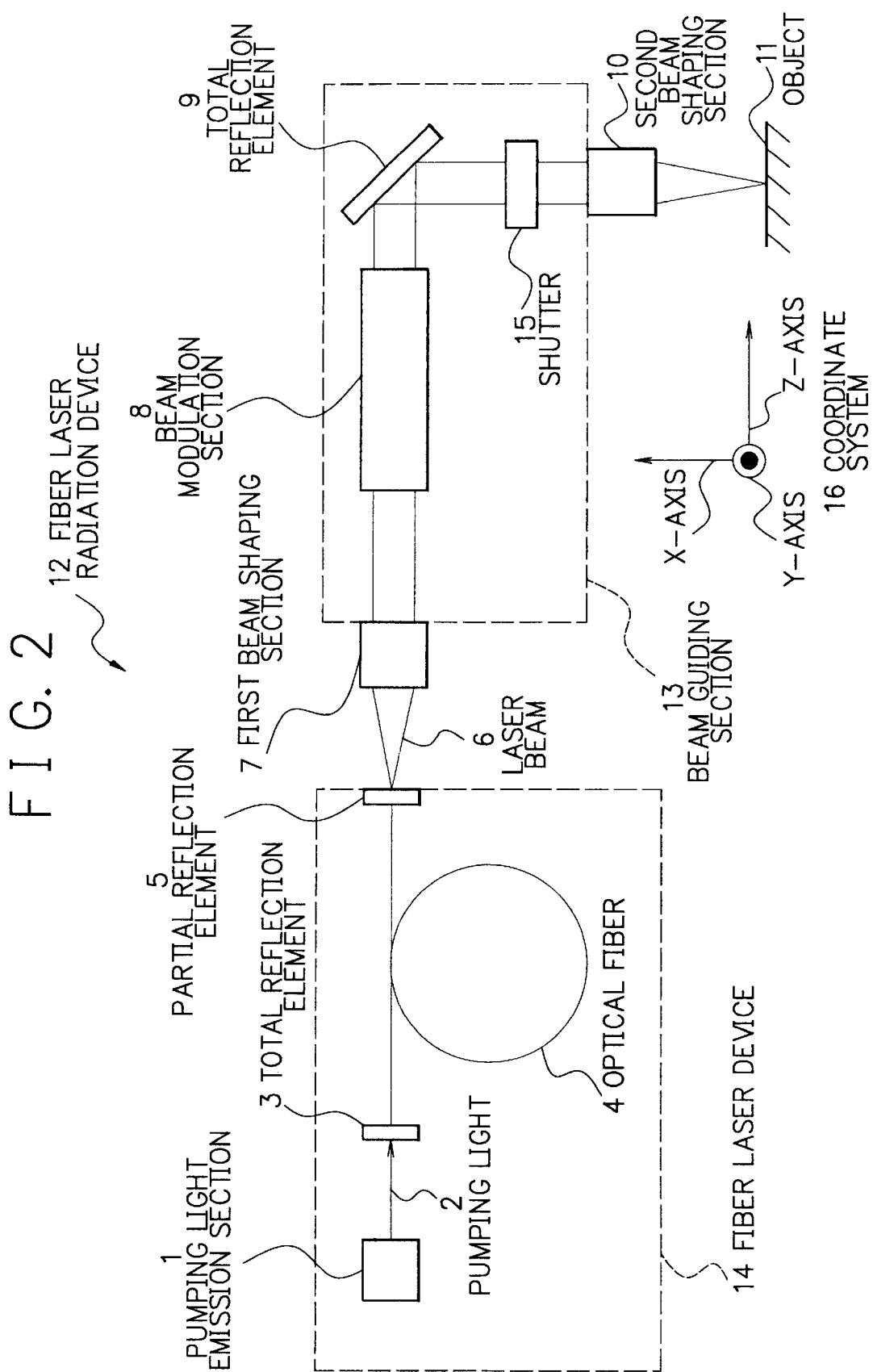
FIG. 2 is a schematic diagram showing a laser radiation device according to a first embodiment of the present invention.

FIG. 2 is a schematic diagram showing a laser radiation device according to a first embodiment of the present invention.

A fiber laser radiation device 12 shown in FIG. 2 is composed of a fiber laser device 14, a first beam shaping section 7, a beam guiding section 13 and a second beam shaping section 10.

The fiber laser device 14 is provided with an optical fiber 4 as gain medium. The length and core diameter of the optical fiber 4 are 2 m and 10 $\mu$m, for example. The optical fiber 4 is formed of fluoride glass which is mainly composed of zirconium fluoride (~40%). The core of the optical fiber 4 is doped with rare-earth ions (0.25wt % holmium ions, for example) as laser ions.

A total reflection element 3 is attached to one end of the optical fiber 4, and a pumping light emission section 1 (a laser diode (LD) or a fiber Raman laser) is faced to the end of the optical fiber 4 via the total reflection element 3. The pumping light emission section 1 emits pumping light 2 in 890 nm band or 1.1 $\mu$m band which corresponds to an absorption energy band of the holmium ions. Therefore, the holmium ions doped in the core of the optical fiber 4 are pumped up, and thereby a laser beam including two wavelength components (the 3 $\mu$m band and the 2 $\mu$m band) is generated in the optical fiber 4 due to cascade oscillation.

The total reflection element 3 is implemented by a dichroic mirror, for example. The total reflection element 3 transmits the 890 nm band pumping light 2 or the 1.1 $\mu$m band pumping light 2 which is emitted by the pumping light emission section 1 (the laser diode or the fiber Raman laser) with high transmission, however, reflects the 3 $\mu$m band component and the 2 $\mu$m band component of the laser beam generated in the optical fiber 4 with high reflectivity. The total reflection element 3 and a partial reflection element 5 which is attached to the other end of the optical fiber 4 form a laser resonator. The reflectivity of the partial reflection element 5 is 4% or so (Fresnel reflection).

Incidentally, the basic composition and basic principles of the fiber laser device 14 shown in FIG. 2 have been elaborated on in Japanese Patent Application Laid-Open No. HEI10-335734 (by the inventor and the applicant of the present invention).

The laser beam 6 emitted by the fiber laser device 14 including the 3 $\mu$m band component and the 2 $\mu$m band component is shaped into a collimated beam by the first beam shaping section 7 (which is implemented by a germanium lens, for example) and supplied to the beam guiding section 13. The germanium lens of the first beam shaping section 7 is provided with non-reflection coatings with respect to the 3 $\mu$m band and the 2 $\mu$m band so as to transmit the laser beam 6 with high transmission. The refractive index of the germanium for the 3 $\mu$m band component is almost the same as that for the 2 $\mu$m band component, therefore, the two wavelength components of the laser beam 6 which have passed the germanium lens (i.e. the first beam shaping section 7) become components of a collimated beam having the same propagation characteristics.

The beam guiding section 13 includes a beam modulation section 8, a total reflection element 9 and a shutter 15. The laser power ratio between the 3 $\mu$m band component and the 2 $\mu$m band component of the collimated laser beam 6 which is inputted to the beam guiding section 13 is approximately 50:50. The beam modulation section 8, which is implemented by an optical filter etc., modulates the power ratio into 60:40 etc. so that desired effects can be attained on the surface of an object 11 (the skin of a small animal etc.). The collimated laser beam 6, whose laser power ratio has been appropriately modulated by the beam modulation section 8, is reflected by the total reflection element 9 (a gold-coated mirror, for example), and is supplied to the second beam shaping section 10 through the shutter 15.

The laser beam 6 supplied to the second beam shaping section 10 (which is also implemented by a germanium lens etc.) is focused and applied to the object 11. The user of the fiber laser radiation device 12 can arbitrarily turn the laser irradiation ON and OFF by operating the shutter 15.

As a result of a practice conducted by the present inventors using the skin of a rabbit as the object 11, a precise incision as large as the focused beam spot on the skin (the effect of the 3 $\mu$m band component) and hemostasis due to denaturalization of protein (the effect of the 2 $\mu$m band component) could be seen simultaneously at the part of the skin to which the laser beam 6 was focused and applied.

We also applied the laser beam 6 to the surface of the (living) liver of a rabbit in three ways. When only the 3 $\mu$m band component was applied to the surface of the liver, perforation or incision was observed along with bleeding. When only the 2 $\mu$m band component was applied, a thick convex coagulation layer was formed on the liver surface, however, the speed of the perforation/incision was slow. And when both the 3 $\mu$m band component and the 2 $\mu$m band component were applied simultaneously, the coagulation layer was formed in an appropriate thickness, and the precise incision or perforation could be formed on the liver surface at a desirable speed along with attaining hemostasis.

The area of the precise incision and the area of the protein coagulation layer vary depending on the distance between the second beam shaping section 10 (the germanium focusing lens) and the object 11, that is, depending on the sizes of the focused beam spots of the wavelength components. The areas can also be varied by varying the combination of optical elements in the first beam shaping section 7 and the second beam shaping section 10.

For example, when a combination of sapphire lenses and calcium fluoride lenses is employed for the first beam shaping section 7, due to the wavelength-dependence of the focal length which is characteristic of each lens material, the 3 $\mu$m band component and the 2 $\mu$m band component in the laser beam 6 can be shaped into a collimated beam and a slightly widening beam respectively, and thereby the diameter of the focused beam spot of the 2 $\mu$m band component on the object 11 can be made larger than that of the 3 $\mu$m band component.

The fiber laser radiation device 12, having the composition which has been described above, is capable of emitting the laser beam 6 including the two wavelength components (the 3 $\mu$m band component and the 2 $\mu$m band component)

without deteriorating the coaxiality of the two wavelength components. Therefore, the two wavelength components of the laser beam 6 can be applied easily and correctly to any point on the object 11 even if the object 11 has an uneven surface.

In the fiber laser radiation device 12 shown in FIG. 2, the total reflection element 9, the shutter 15 and the second beam shaping section 10 can be formed in one unit or component of the fiber laser radiation device 12, and the unit can arbitrarily be moved in the Z-direction (in the coordinate system 16 shown in FIG. 2). Further, the second beam shaping section 10 in the unit can be designed to be able to move in the X-direction shown in FIG. 2. Therefore, the laser beam 6 including the coaxial two wavelength components can be applied to a desired place on the surface of the object 11, placing the most suitable (or effective) point of the focused laser beam 6 at the desired place on the object 11.

Figure 3:
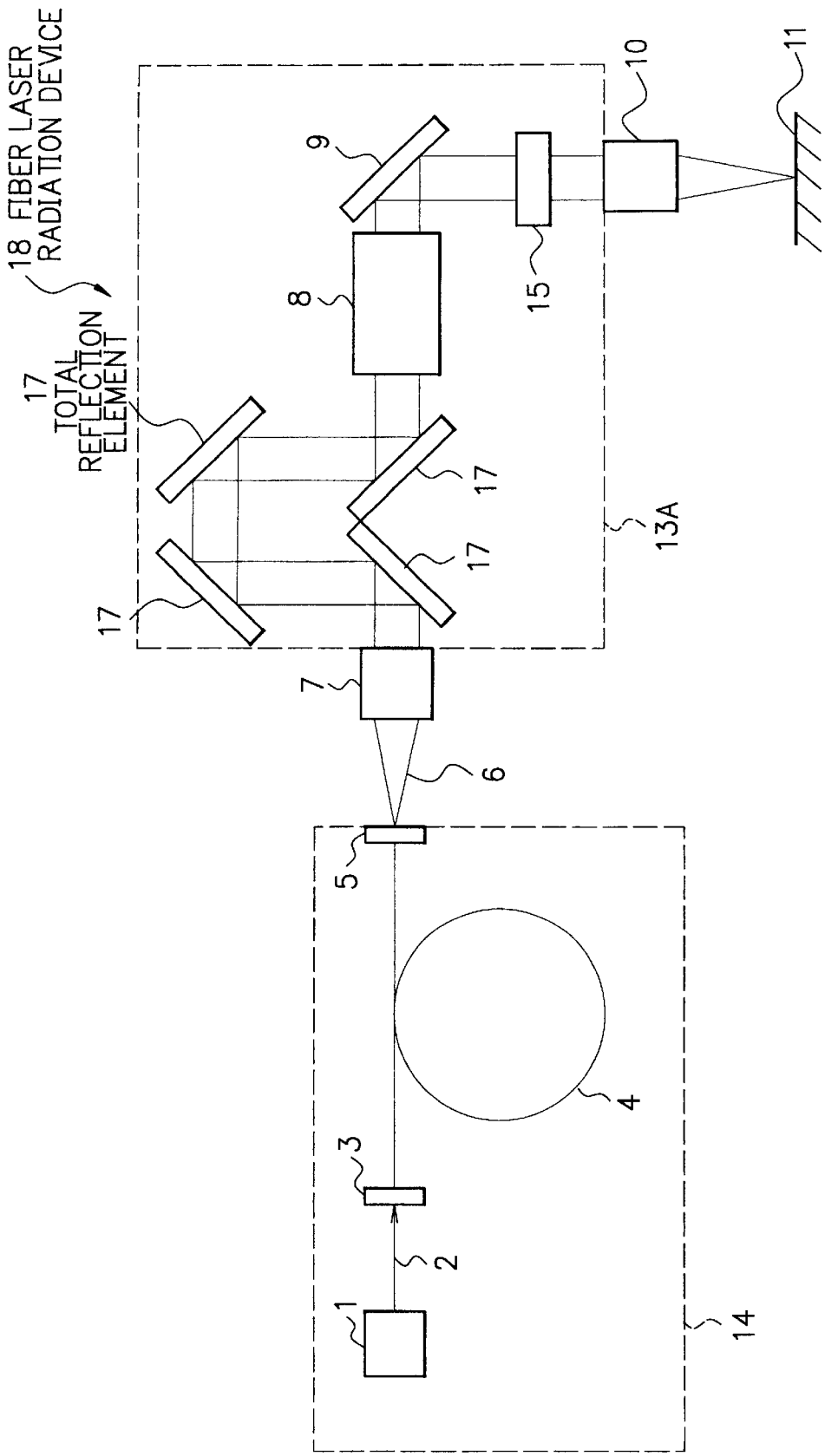
FIG. 3 is a schematic diagram showing a laser radiation device according to a second embodiment of the present invention.

FIG. 3 is a schematic diagram showing a laser radiation device according to a second embodiment of the present invention. While the beam guiding section 13 of the fiber laser radiation device 12 of the first it embodiment (FIG. 2) included only one total reflection element 9, the fiber laser radiation device 18 of FIG. 3 is provided with a beam guiding section 13A having a plurality of total reflection elements which are arranged in a multiple-joint arm configuration. The beam guiding section 13A shown in FIG. 3 is composed of a plurality of total reflection elements 9 and 17, a beam modulation section 8 and a shutter 15. By the multiple-joint arm configuration of the total reflection elements 9 and 17, position/direction controllability of the laser beam 6 can be improved further.

Figure 4:
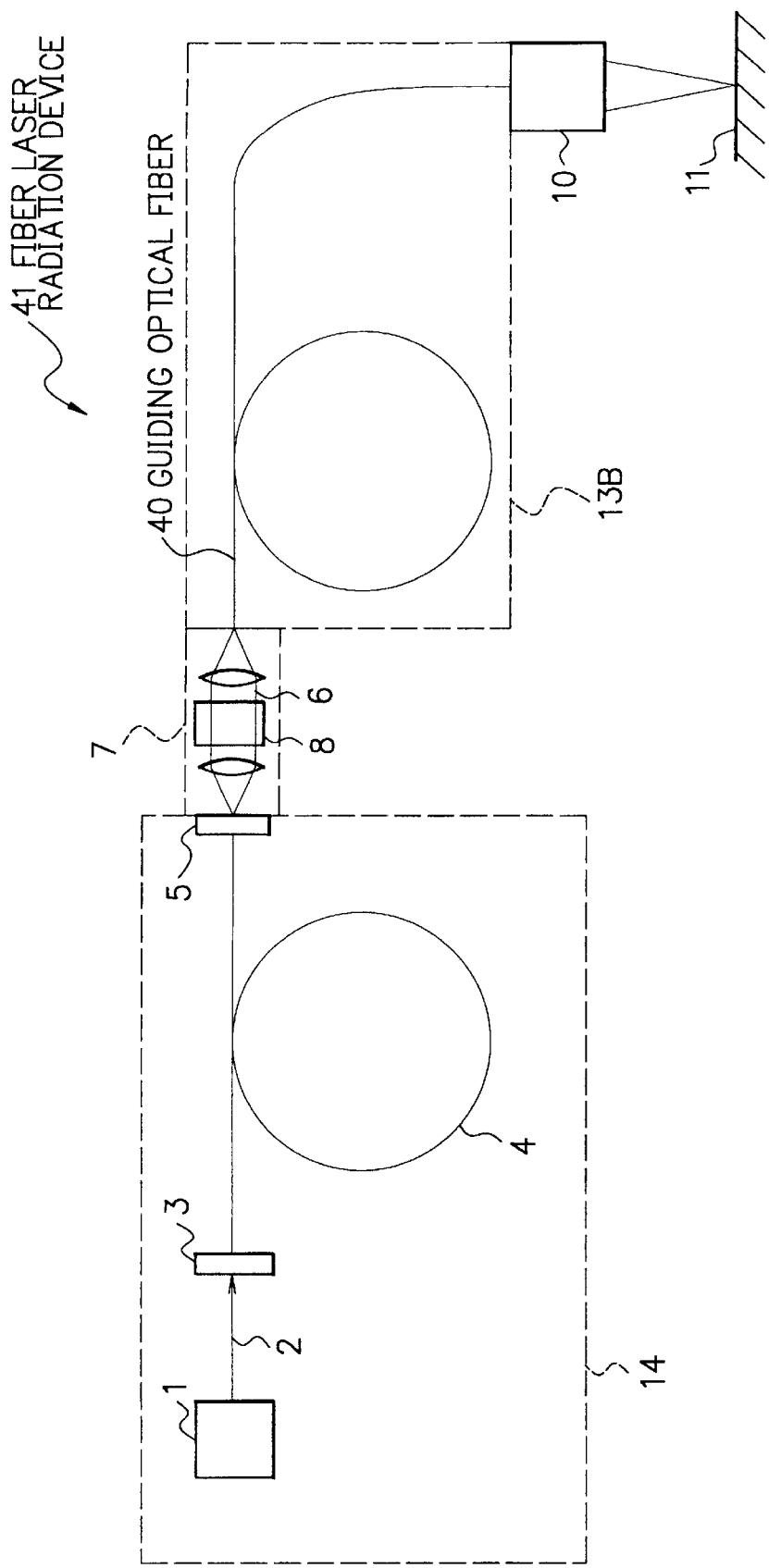
FIG. 4 is a schematic diagram showing a laser radiation device according to a third embodiment of the present invention.

FIG. 4 is a schematic diagram showing a laser radiation device according to a third embodiment of the present invention. While the fiber laser radiation device 18 of the second embodiment (FIG. 3) improved the position/direction controllability of the laser beam 6 by employing the beam guiding section 13A having the multiple-joint arm configuration, the fiber laser radiation device 41 of FIG. 4 is provided with a beam guiding section 13B including a guiding optical fiber 40 for guiding the laser beam 6.

The guiding optical fiber 40 can be formed of material having a low absorption coefficient for the laser beam 6 and high mechanical strength. A fluoride glass fiber, a sapphire fiber, a chalcogenide fiber, a telluride fiber, a hollow waveguide fiber, etc. can be used as the guiding optical fiber 40.

In the fiber laser radiation device 41 of FIG. 4, the beam modulation section 8 is included in the first beam shaping section 7. The first beam shaping section 7 shown in FIG. 4 is composed of a collimator lens for shaping the laser beam 6 into a collimated beam, the beam modulation section 8, and a focusing lens for coupling the laser beam 6 to the guiding optical fiber 40.

It is also possible to connect the optical fiber 4 and the guiding optical fiber 40 together via the partial reflection element 5 only. In such a case, the beam modulation section 8 can be included in the second beam shaping section 10, and thereby the laser power ratio between the two wavelength components can be controlled arbitrarily in the same way.

As shown in the above example, the components of the fiber laser radiation device can be placed and connected in various ways. For example, it is also possible to employ an optical fiber 4 that is also provided with the functions and the characteristics of the guiding optical fiber 40. In such an example, the laser-emitting end of the optical fiber 4 is directly connected to a beam shaping section 10 that includes the beam modulation section 8. The shutter 15 can also be included in the beam shaping section 10.

Figure 5:
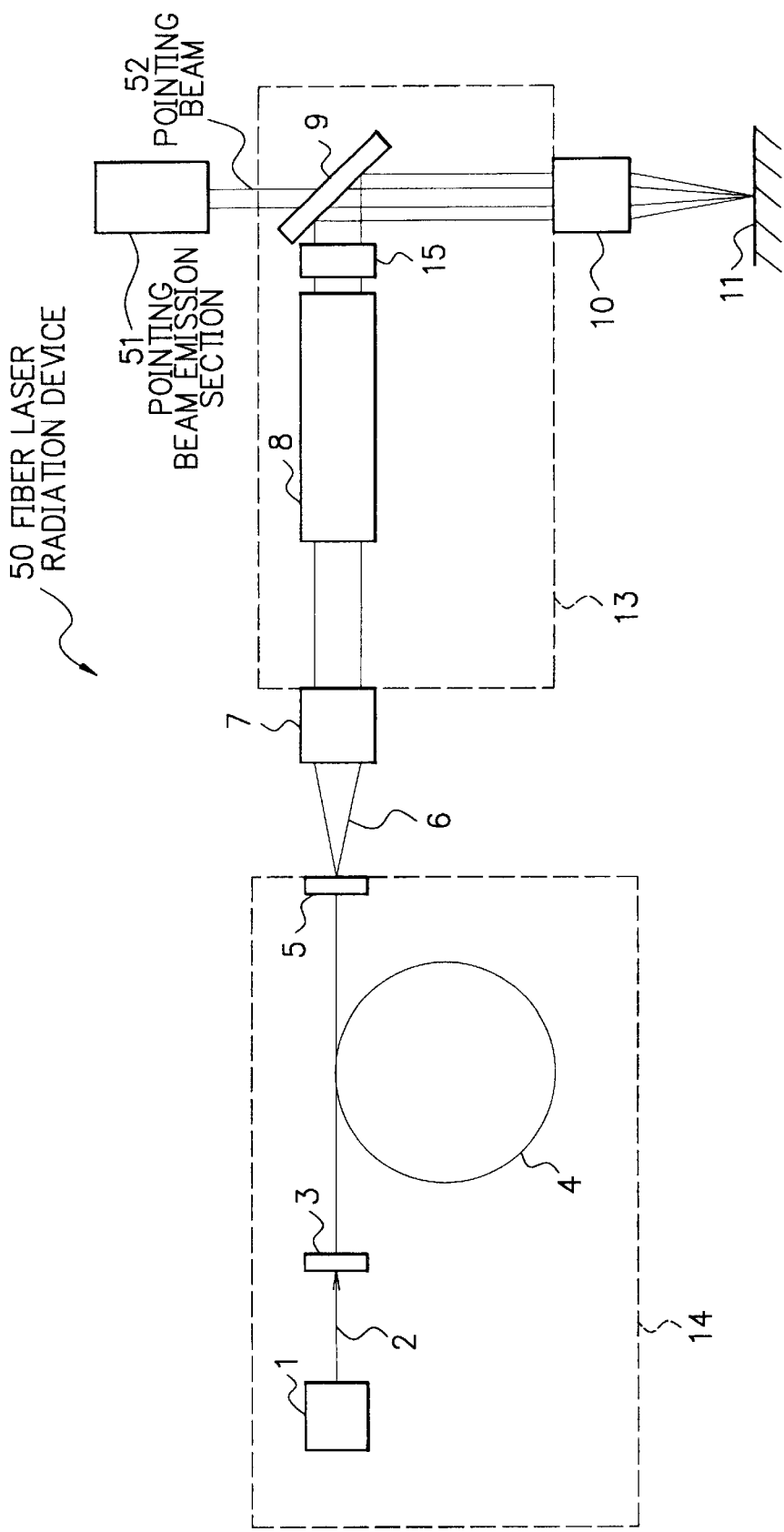
FIG. 5 is a schematic diagram showing a laser radiation device according to a fourth embodiment of the present invention.

FIG. 5 is a schematic diagram showing a laser radiation device according to a fourth embodiment of the present invention. A fiber laser radiation device 50 of FIG. 5 further includes a pointing beam emission section 51, in comparison with the fiber laser radiation device of the first embodiment (FIG. 2). A pointing beam 52 emitted by the pointing beam emission section 51 is mixed into the laser beam 6 at the total reflection element 9, and the laser beam 6 including the pointing beam 52 is focused by the second beam shaping section 10 and applied to the surface of the object 11. We used a helium-neon laser (wavelength: 544 nm or 633 nm) as the pointing beam emission section 51. The total reflection element 9 was implemented by a mirror that is coated with a dielectric multilayer. The total reflection element 9 had high reflectivity for the laser beam 6 and high transmission (transmissivity) for the pointing beam 52 so that the user could see the pointing beam 52 on the surface of the object 11. The pointing beam 52 has to be visible light or light having a wavelength that can be recognized by an electric camera etc. employing image pickup devices.

Due to the pointing beam 52, the user of the fiber laser radiation device 50 can easily see and recognize the irradiation point of the laser beam 6 on the object 11. Therefore, the user can move the laser irradiation point on the object 11 correctly, while keeping the irradiation of the laser beam 6.

Incidentally, it is possible to monitor the status of the object 11 at the laser irradiation point (i.e. monitor the effect of the laser irradiation), by measuring the intensity of the reflection of the pointing beam 52 from the laser irradiation point.

It is also possible to combine the fourth embodiment and the second embodiment together, that is, the beam guiding section 13 of the fiber laser radiation device 50 shown in FIG. 5 can be replaced by the beam guiding section 13A of FIG. 3 having the multiple-joint arm configuration.

It is also possible to combine the fourth embodiment and the third embodiment together. In order to provide the pointing beam 52 of the fourth embodiment to the fiber laser radiation device 41 of the third embodiment shown in FIG. 4, an optical coupler which is suitable for the wavelengths of the pointing beam 52 and the wavelength components of the laser beam 6 is attached to the guiding optical fiber 40, and thereby the pointing beam 52 emitted by the pointing beam emission section 51 is coupled to the laser beam 6. Needless to say, it is also possible to combine the fourth embodiment and the second embodiment together.

Figure 6:
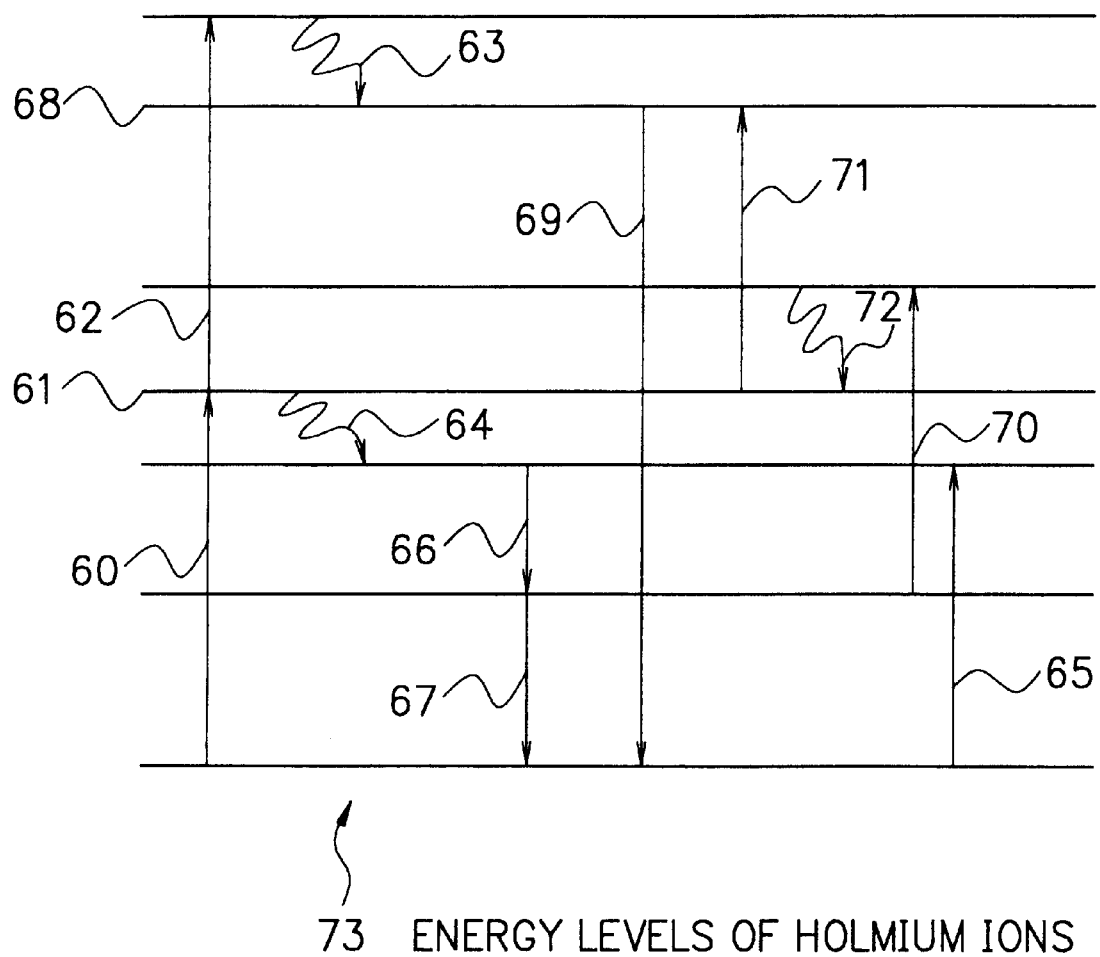
FIG. 6 is an energy level diagram for explaining the operation of a laser radiation device according to a fifth embodiment of the present invention.

FIG. 6 is an energy level diagram for explaining the operation of a laser radiation device according to a fifth embodiment of the present invention. While the fiber laser radiation device of the fourth embodiment (FIG. 5) further employed the pointing beam emission section 51 for generating the pointing beam 52, it is also possible to let the optical fiber 4 generate the pointing beam 52 and emit the pointing beam 52 coaxially with the laser beam 6.

FIG. 6 shows energy levels 73 of holmium ions. In the case where the 890 nm band pumping light 2 (60) is employed, the holmium ions are pumped from their ground states to an 890 nm band pumped energy level 61. From the 890 nm band pumped energy level 61, a nonradiative transition 64 occurs first, and thereafter a cascade oscillation including a 3 μm band laser transition 66 and a 2 μm band laser transition 67 occurs. In this case, an 890 nm band excited state absorption 62 also occurs, and a 550 nm band emission transition 69 from a 550 nm band pumped energy level 68 occurs after a nonradiative transition 63.

Similarly to the case of the 890 nm band pumping light 60, in the case where the 1.1 μm band pumping light 2 (65) is employed, the cascade oscillation including the 3 μm band laser transition 66 and the 2 μm band laser transition 67 also occurs. In this case, a first 1.1 μm band excited state absorption 70, a nonradiative transition 72 and a second 1.1 μm band excited state absorption 71 also occur successively, and thereafter, the 550 nm band emission transition 69 from the 550 nm band pumped energy level 68 occurs.

The probability of the 550 nm band emission transition 69 in the above pumping processes is lower than the probabilities of the 3 μm band laser transition 66 and the 2 μm band laser transition 67, and the emission by the 550 nm band emission transition 69 is fluorescence in most cases. However, the light due to the 550 nm band emission transition 69 is emitted coaxially with the laser beam 6, and thus the 550 nm band light can be used as the pointing beam 52.

Therefore, it is possible to let the optical fiber 4 (i.e. the gain medium) of the fiber laser device 14 include the pointing beam emission section 51 for emitting a visible pointing beam 52, in the fiber laser radiation devices 12, 18 and 41 of the first, the second and the third embodiments. It is also possible to control the intensity of the emission by the 550 nm band emission transition 69, by letting the pumping light emission section 1 emit both the 890 nm band pumping light 60 and the 1.1 μm band pumping light 65 and controlling the intensity rate between them.

Fluorescence of another wavelength can also be obtained by co-doping other rare-earth ions such as thulium ions to the optical fiber 4 along with the holmium ions (i.e. laser ions), and such fluorescence can also be used as the pointing beam 52. For example, when thulium ions are pumped by the 1.1 μm band pumping light 2, 480 nm blue luminescence can be obtained after three times of excitation transitions.

While the thulium ions were co-doped with the holmium ions in the same optical fiber 4 in the above example, it is also possible to obtain the same 480 nm blue luminescence by connecting an optical fiber doped with thulium ions to the optical fiber 4 including the holmium ions as laser ions.

If the total reflection element 3 and the partial reflection element 5 in the fiber laser device 14 are formed to have suitable reflectivity for the 550 nm light due to the holmium ions or the 480 nm light due to the thulium ions, it is possible to let the third laser oscillation occur in the fiber laser device 14.

While the holmium ions were doped to the optical fiber 4 as the laser ions in the above embodiments in order to obtain the laser beam 6 including the 3 μm band component and the 2 μm band component, it is also possible to use other rare-earth ions such as thulium ions, erbium ions, ytterbium ions, praseodymium ions, etc. as the laser ions.

The present inventors actually manufactured the fiber laser radiation device 41 shown in FIG. 4 and provided suitable reflectivity to the partial reflection element 5 with respect to the 3 μm band, the 2 μm band and the 550 nm band. As a result, three laser oscillations in the three bands could be observed. When the total power of the laser diode was 10 W, the laser powers of the 3 μm band component, the 2 μm band component and the 550 nm band component were 3 W, 3 W and 5 mW, respectively. In the experiment, an 890 nm band laser diode and a 1.1 μm band laser diode were used together as the pumping light emission section 1. The second beam shaping section 10 was implemented by a combination of three sapphire lenses, and thereby coaxial three focused beam spots of the three wavelength components having approximately the same diameters could be observed on the surface of the object 11. Progress of carbonization of the skin of a rabbit could be monitored in real time, by monitoring the intensity of the reflection of the 550 nm band pointing beam 52 from the surface of the rabbit skin.

Figure 7:
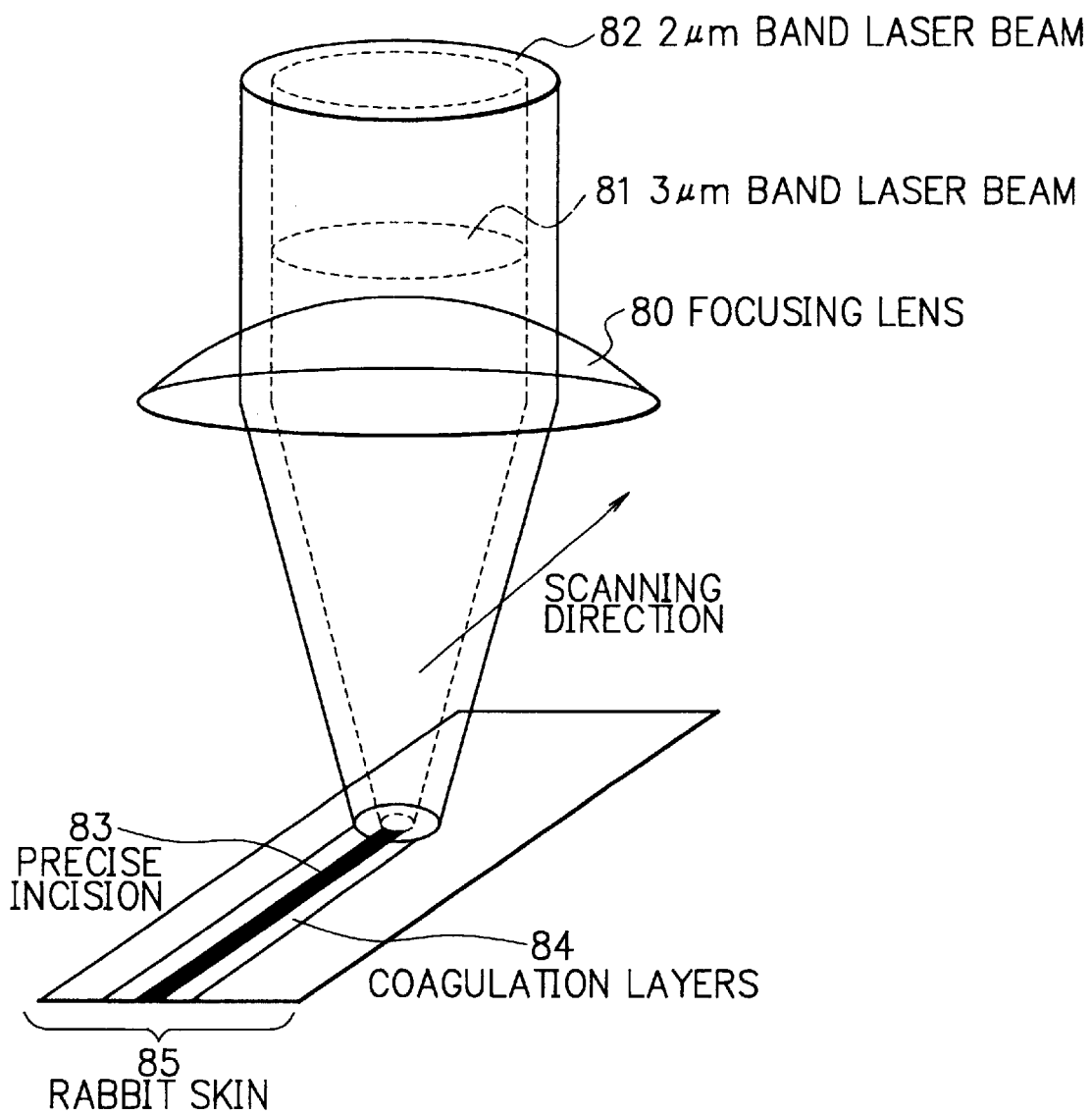
FIG. 7 is a schematic diagram showing an example of the result of an experiment conducted by the present inventors.

FIG. 7 is a schematic diagram showing an example of the result of the experiment conducted by the present inventors. In the experiment, each of the first beam shaping section 7 and the second beam shaping section 10 was implemented by a combination of sapphire lenses and calcium fluoride lenses. As shown in FIG. 7, coaxial two circular beam spots: a focused beam spot of the 3 μm band laser beam 81 which is 100 μm in diameter and a focused beam spot of the 2 μm band laser beam 82 which is 200 μm in diameter, could be obtained on the rabbit skin 85. By moving the coaxial laser beams on the rabbit skin 85 linearly, coagulation layers 84 due to the 2 μm band laser beam 82 were formed on both sides of a precise incision 83 due to the 3 μm band laser beam 81, and thereby precise incision along with enough hemostasis effect could be realized.

The total electricity-light conversion efficiency of the fiber laser radiation device 41 of the experiment (from the emission of the pumping light to the irradiation of the object 11) was 10%, which is far higher than the case of the conventional laser radiation device 31 of FIG. 1 (less than 1%). Further, the size of the laser radiation device according to the present invention (employing the fiber laser device 14 capable of emitting a laser beam including two or more wavelength components) could be reduced to half in volume, in comparison with the conventional laser radiation device 31 of FIG. 1 (employing two laser devices 21 and 24 for obtaining two desired wavelength components). Furthermore, the laser radiation device according to the present invention including only one fiber laser device 14 can be manufactured with approximately half the manufacturing cost of the conventional laser radiation device 31 of FIG. 1 which includes two laser devices 21 and 24.

As set forth hereinabove, by the laser radiation device according to the present invention, a laser beam including two or more wavelength components having characteristic effects can be emitted and applied to the object coaxially. The shapes and areas of focused beam spots of the wavelength components on the object 11 can arbitrarily be controlled independently by the second beam shaping section 10, and the laser powers of the wavelength components can be varied independently by the beam modulation section 8. Therefore, new types of laser processing using the two or more wavelength components having different effects can be realized in the fields of metal processing, semiconductor processing, medical care, etc.

The two or more wavelength components in the laser beam are emitted coaxially by the fiber laser device 14, guided by the beam guiding section 13, 13A or 13B maintaining the coaxiality, and are applied to the same point on the object 11. Therefore, the two or more wavelength components can be applied easily and correctly to any point of the object 11 without losing the coaxiality, even if the object 11 has an uneven surface.

Incidentally, while the second beam shaping section 10 (focusing lens) was employed for focusing the laser beam 6 to be applied to the object 11 in the above embodiments, it is also possible to apply the laser beam 6 directly from the beam guiding section 13, 13A or 13B, without using the focusing lens.

In the laser radiation device according to the present invention, the two or more wavelength components can be obtained by use of one fiber laser device 14, without using two or more laser devices corresponding to the desired wavelength components. Therefore, the number of optical parts of the device can be decreased, and thus the cost and the size of the laser radiation device can be reduced, and manufacturing efficiency of the device can be increased.

As mentioned above, the laser powers of the wavelength components of the laser beam can arbitrarily be controlled by the beam modulation section 8 independently. Therefore, in the case where the laser radiation device is employed for a surgical laser knife, the intensity of the 3 μm band component (which is suitable for precise incision of a living body) and the intensity of the 2 μm band component (which is suitable for tissue coagulation and hemostasis by means of denaturalization of protein) can be controlled independently and optimized, for example.

The laser radiation device according to the present invention can also be provided with the pointing beam emission section 51 for emitting the pointing beam 52. The pointing beam 52 emitted by the pointing beam emission section 51 can be coupled to the laser beam 6 by the total reflection element 9 composed of a dichroic mirror, an optical coupler which is attached to the guiding optical fiber 40 of the third embodiment, etc. The user of the laser radiation device can easily see and recognize the irradiation point of the laser beam 6 on the object 11, therefore, the user can move the laser irradiation point on the object 11 correctly, while keeping irradiation of the laser beam 6 in uniform and stable irradiation condition.

The pointing beam emission section 51 can also be included in the optical fiber 4 of the fiber laser device 14. In other words, it is also possible to let the optical fiber 4 of the fiber laser device 14 emit the pointing beam 52 along with emitting the two or more wavelength components. By such composition, the irradiation of the pointing beam 52 on the object 11 can be realized with a decreased number of optical parts of the laser radiation device, and thus manufacturing cost of the device can be decreased while improving manufacturing efficiency and operation efficiency of the device.

The pointing beam 52 can also be obtained as a laser beam. The status of the object 11 at the laser irradiation point (i.e. the effect of the laser irradiation) can be monitored in real time, by monitoring the intensity of the reflection of the pointing beam 52 from the laser irradiation point.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A laser radiation device, comprising:
    a pumping light emission section that generates and emits pumped light;
    a fiber laser, including an optical fiber doped with lasant ions that are excited by the pumped light, which provides a laser beam including two or more wavelength components;
    a first beam shaping section that collimates the two or more wavelength components of the laser beam emitted by the fiber laser by a lens, wherein a material of the lens is such that an index of refraction for at least two of the two or more wavelength components is substantially the same; and
    a beam guiding section that guides the laser beam in a two-axis coordinate plane perpendicular to an optical axis of the laser beam.

2. A laser radiation device as claimed in claim 1, further comprising a second beam shaping section that shapes the laser beam guided by the beam guiding section.

3. A laser radiation device as claimed in claim 2, wherein the second beam shaping section focuses the laser beam so that the at least two of the two or more wavelength components are focused on an object and other wavelength components, other than the at least two of the two or more wavelength components, are directed to the object.

4. A laser radiation device as claimed in claim 3, wherein the second beam shaping section controls at least an area and a shape of a beam spot of each of the at least two of the two or more wavelength components by varying a distance between the second beam shaping section and the object.

5. A laser radiation device, comprising:
    a pumping light emission section that generates and emits pumped light;
    a fiber laser, including an optical fiber doped with lasant ions that are excited by the pumped light, which provides a laser beam including two or more wavelength components;
    a first beam shaping section that collimates the two or more wavelength components of the laser beam emitted by the fiber laser by a lens to generate a collimated beam;
    a beam modulator for modulating a power ratio between each of the two or more wavelength components included in the laser beam; and
    a beam guiding section that guides the laser beam to an object.

6. A laser radiation device as claimed in claim 5, wherein the beam modulator includes one or more optical filters which change the transmitted power of at least one of the two or more wavelength components by reducing an amount of light transmitted.

7. A laser radiation device as claimed in claim 1, wherein the beam guiding section comprises a guiding optical fiber.

8. A laser radiation device, comprising:
    a pumping light emission section that generates and emits pumped light;
    a fiber laser, including an optical fiber doped with lasant ions that are excited by the pumped light, which provides a laser beam including two or more wavelength components;
    a first beam shaping section that collimates the two or more wavelength components of the laser beam emitted by the fiber laser by a lens to generate a collimated beam;
    a beam guiding section that guides the laser beam to an object; and
    a pointing beam emission section which generates and emits a pointing beam for indicating at least one of the optical axis of the laser beam and an irradiation point of the laser beam on the object.

9. A laser radiation device as claimed in claim 8, further comprising a pointing beam coupler for coupling the pointing beam emitted by the pointing beam emission section with the laser beam coaxially.

10. A laser radiation device as claimed in claim 9, wherein the pointing beam coupling means comprises a total reflection element of the beam guiding section, which transmits the pointing beam while reflecting the laser beam.

11. A laser radiation device as claimed in claim 9, wherein the pointing beams coupler comprises an optical coupler which is attached to a guiding fiber which forms the beam guiding section.

12. A laser radiation device as claimed in claim 8, wherein at least one of the two or more wavelength components of the laser beam generated by the fiber laser comprises a visible beam, and at least one visible beam comprises the pointing beam.

13. A laser radiation device as claimed in claim 8, further comprising a pointing beam reflection monitor which monitors the irradiation point in real time by monitoring an intensity of a reflection of the pointing beam from the irradiation point.

14. A laser radiation device as claimed in claim 1, wherein the lasant ions comprise one or more kinds of rare-earth ions.

15. A laser radiation device as claimed in claim 1, wherein the pumping light emission section includes one or more light sources and generates and emits the pumped light, which includes two or more wavelength components.

16. A laser radiation device as claimed in claim 1, wherein the optical fiber of the fiber laser is doped with at least one of holmium ions and thulium ions.

17. A laser radiation device as claimed in claim 1, wherein the optical fiber of the fiber laser is doped with holmium ions as lasant ions, and an optical fiber doped with thulium ions is connected to the optical fiber of the fiber laser for emitting a 480 nm band pointing beam for indicating at least one of the optical axis of the laser beam and an irradiation point of the laser beam on an object.

18. A laser radiation device, comprising:
   a pumping light emission section that generates and emits pumped light;
   a fiber laser, including an optical fiber doped with lasant ions that are excited by the pumped light, which provides a laser beam including two or more wavelength components;
   a first beam shaping section that collimates the two or more wavelength components of the laser beam emitted by the fiber laser by a lens to generate a collimated beam; and
   a beam guiding section that guides the laser beam to an object,
      wherein the beam guiding section includes two or more reflection elements which are arranged in a multiple-joint arm configuration.

19. A laser radiation device, comprising:
   a pumping light emission section that generates and emits pumped light;
   a fiber laser, including an optical fiber doped with lasant ions that are excited by the pumped light, which provides a laser beam including two or more wavelength components;
   a first beam shaping section that collimates the two or more wavelength components of the laser beam emitted by the fiber laser by a lens to generate a collimated beam; and
   a beam guiding section that guides the laser beam to an object,
      wherein holmium ions comprise the lasant ions, the pumping light emission section generates and emits the pumped light that includes at least one of 890 nm band pumping light and 1.1 μm band pumping light, and the laser beam emitted by the optical fiber of the fiber laser includes at least a 3 μm band component and a 2 μm band component.

20. A laser radiation device, comprising:
   a pumping light emission section that generates and emits pumped light;
   a fiber laser, including an optical fiber doped with lasant ions that are excited by the pumped light, which provides a laser beam including two or more wavelength components;
   a first beam shaping section that collimates the two or more wavelength components of the laser beam emitted by the fiber laser by a lens to generate a collimated beam; and
   a beam guiding section that guides the laser beam to an object,
      wherein holmium ions comprise the lasant ions, the pumping light emission section generates and emits the pumped light that includes at least one of 890 nm band pumping light and 1.1 μm band pumping light, and the laser beam emitted by the optical fiber of the fiber laser includes at least a 3 μm band component and a 2 μm band component, and
      wherein the optical fiber of the fiber laser further emits at least one of a fluorescent light of a 550 nm band and a 640 nm band.

21. A laser radiation device, comprising:
   a pumping light emission section that generates and emits pumped light;
   a fiber laser, including an optical fiber doped with lasant ions that are excited by the pumped light, which provides a laser beam including two or more wavelength components;
   a first beam shaping section that collimates the two or more wavelength components of the laser beam emitted by the fiber laser by a lens to generate a collimated beam; and
   a beam guiding section that guides the laser beam to an object,
      wherein thulium ions comprise the lasant ions in the optical fiber of the fiber laser, and the laser beam emitted by the optical fiber of the fiber laser includes two or more wavelength components and fluorescent light of a 480 nm band.

22. A laser radiation device, comprising:
   a pumping light emission section that generates and emits pumped light;
   a fiber laser, including an optical fiber doped with lasant ions that are excited by the pumped light, which provides a laser beam including two or more wavelength components; and
   a beam guiding section that guides the laser beam in a two-axis coordinate plane perpendicular to an optical axis of the laser beam, wherein the beam guiding section comprises the optical fiber of the fiber laser, at least one wavelength component of the laser beam incises tissues, and at least one wavelength component of the laser beam coagulates proteins.

* * * * *